United States Patent [19]
Cowles

[11] 3,974,476
[45] Aug. 10, 1976

[54] HIGHLY-DIRECTIONAL ACOUSTIC SOURCE FOR USE IN BOREHOLE SURVEYS

[75] Inventor: Christopher S. Cowles, Houston, Tex.

[73] Assignee: Shell Oil Company, Houston, Tex.

[22] Filed: Apr. 25, 1975

[21] Appl. No.: 571,464

[52] U.S. Cl. .............................. 340/18 R; 181/104; 181/102; 181/108
[51] Int. Cl.² .......................................... G01V 1/40
[58] Field of Search ............ 340/15.5 BH, 17, 18 R, 340/18 FM; 181/103, 102, 104, 106, 108, 113, 119, 142

[56] References Cited
UNITED STATES PATENTS

| | | |
|---|---|---|
| 2,825,044 | 2/1958 | Peterson .......................... 340/18 R |
| 3,015,801 | 1/1962 | Kalbfell ........................... 340/18 FM |
| 3,504,758 | 4/1970 | Dueker ............................... 181/104 |
| 3,542,150 | 11/1970 | Youmans ........................... 181/104 |

Primary Examiner—Maynard R. Wilbur
Assistant Examiner—T. M. Blum

[57] ABSTRACT

A highly directional acoustic source for use in a well logging system wherein a fluid-filled tube is provided with a transducer at one end and an acoustic reflector at the other end to reflect the acoustic beam into the formation. The transducer is excited at two frequencies whose difference is the desired frequency and the tube is made sufficiently long to produce parametric generation of the difference frequency.

9 Claims, 2 Drawing Figures

HIGHLY-DIRECTIONAL ACOUSTIC SOURCE FOR USE IN BOREHOLE SURVEYS

BACKGROUND OF THE INVENTION

The present invention relates to acoustical devices and particularly to a highly directional sound source for an acoustical inspection device. Acoustical devices utilizing sound sources for generating acoustical waves that impinge upon a surface are used to inspect various materials. In addition, such devices have been used to map the formation surrounding a borehole, as for example as shown in U.S. Pat. No. 2,825,044. In this patent a sound source is used to generate a highly directional acoustical pulse which travels radially and penetrates into the formation surrounding the borehole. Means are provided for detecting the reflected acoustic wave and recording a characteristic of the reflected acoustic wave.

Similar devices to that described in the patent have also been used to provide a map of the prominent characteristics of the well bore formations, for example the locations of fractures in the rock formations surrounding a borehole. In this type of mapping device the amplitude of the reflected signal is recorded in relation to the position of the tool in the borehole. All of the above devices require the use of a highly directional sound source for producing acoustic waves. To obtain directionality one must use either an extremely large sound source or extremely high frequencies. The use of large sound source causes problems in the physical size of the device and limits its usefulness. The use of high frequencies reduces the penetration of the acoustic energy and, thus, limits the usefulness of the device.

BRIEF SUMMARY OF THE INVENTION

The present invention solves the above problems by relying on parametric generation to obtain a highly directional sound source of the desired frequency while using small size sources. Parametric generation depends upon the production in a liquid of two pressure waves having separate frequencies to produce a pressure wave having a frequency equal to the difference of the separate frequencies. For example, if one desires an acoustic wave of 1 KHz, one could use frequencies of 4999.5 KHz and 5000.5 KHz. The use of the parametric phenomena allows one to use smaller transducers while, at the same time, producing highly directional low frequency acoustic waves having good penetration.

In the present invention the transducer is mounted at one end of the tubular housing while the opposite end of the tubular housing is provided with an acoustic reflector which will direct the acoustic energy at substantially 90° to the longitudinal axis of the housing. The tubular housing is filled with a liquid which, in the case of a well logging instrument, may be the borehole fluid. The two frequencies for energizing the transducer can be supplied from separate oscillating circuits, with the individual frequencies being added and supplied simultaneously to the transducer. The length of the tubular housing must be selected in relationship to the frequencies used in energizing the transducer. Thus, for the example given of 4999.5 KHz and 5000.5 KHz the length of the housing could be approximately 400 centimeters.

The transducer can be gated between the adding circuit and a receiving circuit so that the same transducer can be used to receive the reflected acoustic wave. Various characteristics of the reflected acoustic wave, for example its maximum amplitude, can be recorded to provide a map of the formation surrounding the borehole.

BRIEF DESCRIPTION OF THE DRAWINGS

The present invention will be more easily understood from the following detailed description of a preferred embodiment taken in conjunction with the attached drawings in which.

PREFERRED EMBODIMENT

Figures 1, 2:
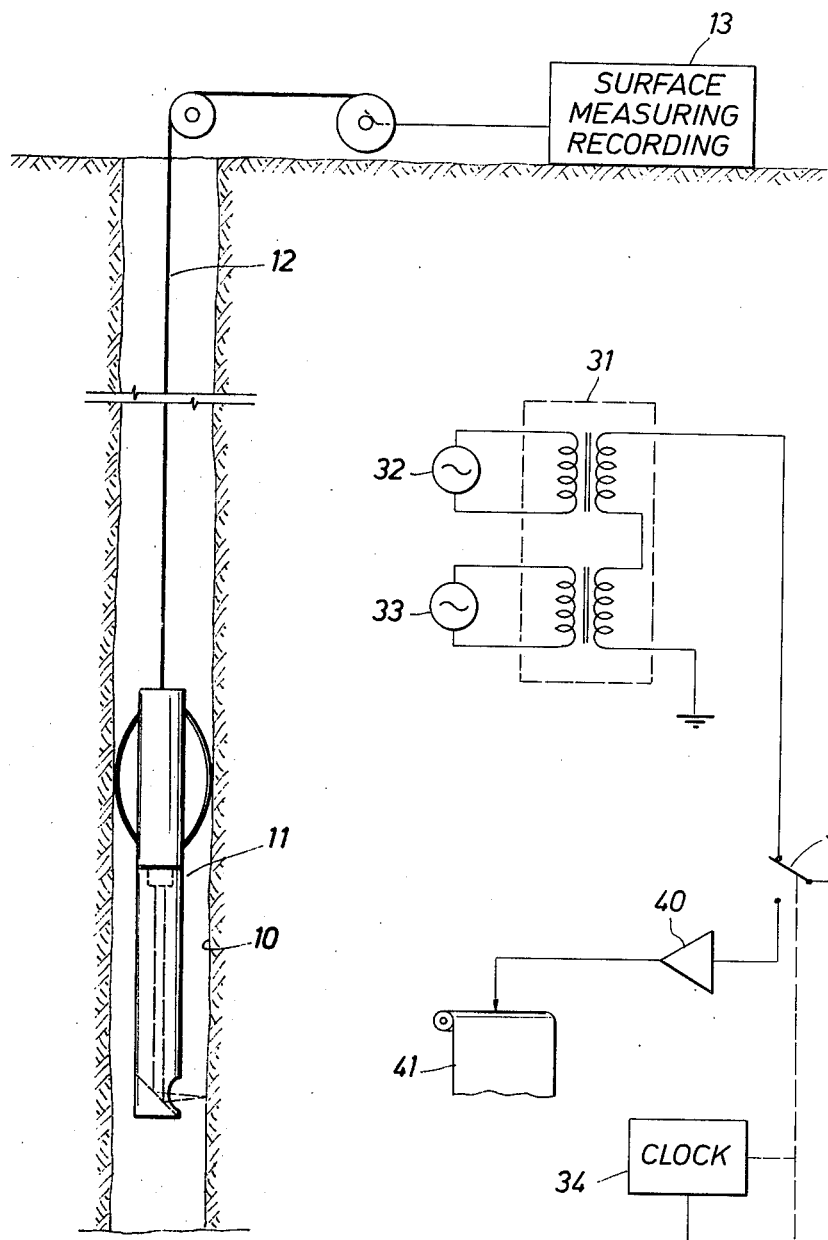
FIG. 1 shows the invention applied to a logging tool suspended in a borehole.
FIG. 2 shows the detailed construction of the sound source and associated circuitry.

Referring now to FIG. 1 as showing a logging tool 11 suspended in a borehole 10. The logging tool may be any type of acoustic tool that is designed to inspect the formation surrounding the borehole by means of directional acoustical waves. For example, the tool could be of the type shown in the above referenced patent, or of the type where the amplitude of the reflected acoustic wave is recorded to form a visual or graphic record of the formation. The logging tool is suspended in the borehole by means of a conventional logging cable 12 which is coupled to the surface recording equipment 13.

Referring now to FIG. 2 there is shown the detailed construction of the sound source. The sound source comprises of an elongated tubular housing 20 having a transducer 21 mounted on one end and an acoustical reflector 22 mounted in the opposite end. The transducer may be a conventional piezoelectric or magnetostrictive transducer while the acoustical reflector 22 may be a block of some relatively in-elastic material such as steel. In addition, the acoustical reflector is provided with an inclined surface, for example a 45° surface to reflect the acoustic waves at right angles to the longitudinal axis of the housing. The reflected acoustic waves will pass out the opening 23 in the housing and impinge upon the borehole wall while the wave reflected by the formation can pass through the housing and be reflected to the transducer 21. When the sound source is used in a logging tool the borehole fluid can be used to fill the interior of the elongated housing and provide the next necessary liquid for the generation of the acoustic wave by parametric generation.

While the actual sizes and frequencies used will vary with the desired acoustic frequency, for normal well logging applications one could use a transducer having a diameter of approximately 7.5 centimeters. This transducer could be energized with frequencies of 4999.5 KHz and 5000.5 KHz to produce a highly directional acoustic wave of 1 KHz. Also, the elonated tubular housing 20 can have an outside diameter of approximately 8.5 centimeters and an overall length of 450 centimeters. The above conditions and dimensions are applicable to a borehole logging tool where the tubular housing is filled with borehole fluid wherein the speed of sound is approximately 5,000 feet per second and the desired frequency of the acoustic pulse is 1 KHz. When the tubular housing is filled with a different liquid and one desires a different frequency for the acoustic pulse the dimensions of the housing and the transducer will change. As the designed frequency of the acoustic pulse increases the size of the transducer can be decreased. Likewise, when the speed of sound in the fluid filling the tubular housing decreases the overall length of the housing can also decrease. Under most conditions, it will not be feasible to reduce the overall length of the housing to less than 2 times the wave length of the desired frequency of the acoustic pulse.

The transducer may be energized through the use of an adding circuit 31 and two oscillators 32 and 33. The adding circuit should be designed to add arithmetically the output of each oscillator and supply the resulting signal to a gate or switch 30. A gate 30 is used for switching the transducer between the adding circuit and a recording circuit. The gate is controlled by a clock 34 and delay circuit 36. Each clock pulse positions the gate to connect the transducer to the adding circuit while the delay circuit positions the gate to connect the transducer to the recording circuit. The delay between the clock signal and the delay circuit signal should be long enough to produce a difference-frequency pulse and should be shorter than the shortest time between the production of a pulse and the arrival of the first reflection at the transducer. The time period between clock pulses should be long enough to generate an acoustic wave and receive all reflections of interest. The recording circuit may consist of an amplifier 40 and a recorder 41.

While the above circuits are one means for energizing the transducer and recording the reflected signals, others may be used. The circuits disclosed in the above patent could be used or the circuits used in borehole mapping systems could be substituted. Likewise, the transducer could be used in an acoustic device where other characteristics of the acoustic wave are measured.

I claim as my invention:

1. A highly directional acoustic source for use in acoustic profile well logging systems comprising:
   a tubular housing, said housing being adapted to be disposed in a well with its longitudinal axis aligned with the axis of the well;
   an acoustic transducer, said transducer being mounted in one end of said tubular housing and positioned to direct an acoustic wave along the longitudinal axis of said tubular housing;
   an acoustic reflector, said reflector being mounted in the other end of said tubular housing and disposed to reflect said acoustic wave into the formations surrounding the well; and
   a circuit means, said circuit means being coupled to said transducer and disposed to excite said transducer simultaneously at two distinct frequencies whose difference is equal to the desired frequency of said acoustic wave, said transducer producing pressure waves whose frequencies correspond to said two distinct frequencies.

2. The acoustic source of claim 1 wherein said circuit means excites said transducer at both frequencies simultaneously.

3. The acoustic source of claim 2 wherein the difference in said frequencies is between 10 and 10,000 Hz.

4. The acoustic source of claim 1 wherein the length of said tubular housing is at least 2 wavelengths of the difference frequency.

5. The acoustic source of claim 1 and in addition said tubular housing being filled with a liquid.

6. The acoustic source of claim 5 wherein said tubular housing is provided with an opening in its side wall adjacent the said other end thereof whereby well fluid may enter said tubular housing and the acoustic wave may be reflected into the formations surrounding the well.

7. A directional sound source for an acoustic inspection device comprising:
   a closed tubular housing, said housing being filled with a liquid;
   an acoustic transducer, said transducer being mounted in one end of said housing and positioned to produce an acoustic wave in said liquid traveling along the longitudinal axis of the housing;
   an acoustic reflector mounted in the other end of said housing and disposed to reflect said acoustic wave at an angle to pass through the side wall of said housing;
   an acoustically transparent window, said window being mounted in the side wall of said housing and disposed in the path of said reflected acoustic wave; and
   a circuit means, said circuit means being coupled to said transducer to energize said transducer simultaneously at two distinct frequencies whose difference is equal to the desired frequency of the acoustic wave, said transducer producing pressure waves in said fluid whose frequencies correspond to said two distinct frequencies.

8. The apparatus of claim 7 wherein said circuit means comprises two oscillators and an adding circuit.

9. The apparatus of claim 8 and in addition a gate and second circuit means for actuating said gate to couple said transducer first to said first mentioned circuit means and second to a recording means.

* * * * *